April 28, 1931.    W. B. LUCAS    1,803,119
POSITION INDICATOR
Filed May 10, 1930

William Bater Lucas  INVENTOR
BY  *Matthew C. J. Bradley*  ATTORNEY

Patented Apr. 28, 1931

1,803,119

UNITED STATES PATENT OFFICE

WILLIAM BATES LUCAS, OF EAST ORANGE, NEW JERSEY, ASSIGNOR TO OTIS ELEVATOR COMPANY, OF NEW YORK, N. Y., A CORPORATION OF NEW JERSEY

POSITION INDICATOR

Application filed May 10, 1930. Serial No. 451,327.

This invention relates to luminous indicators which are particularly adaptable in elevator systems to indicate the positions of elevator cars.

It is frequently desirable in an elevator system to provide an indicator at one or more places to indicate the position of the elevator car. Such indicators are often placed over the elevator entrance at the ground floor. In addition such an indicator may be mounted upon the car itself so as to inform the car operator and the passengers therein the position of the car in the building. Such an indicator, within the car is particularly desirable in completely enclosed cabs. The accuracy of position indicators for elevator systems is an important consideration, as the caliber of the elevator service is often reflected in the accuracy of such indicators. A factor bearing upon the accuracy of such indicators, particularly in elevator systems employing high speed cars, is the weight and inertia of the moving parts in such indicators; for the greater the weight and inertia of the moving parts, the greater is the strain upon the driving mechanism, and thus, the greater is the possibility of the indicator falling behind in its indications. In addition, it is desirable that the position indicator be simple in construction, be formed of a small number of parts, and be inexpensive to make and install.

One feature of the invention is the provision of a luminous position indicator particularly suitable for elevators in which the weight and inertia of the moving parts are reduced to a small quantity, and in which the total number of parts employed is substantially a minimum.

Other features and advantages will become apparent from the specification taken in connection with the accompanying drawings wherein one embodiment of the invention is illustrated.

In the embodiment of the invention to be described, a source of light is stationarily mounted behind a circular display plate. Surrounding the light source there is rotatably mounted a metal cylinder having a slot therein so that upon rotation of the cylinder a radial beam of light is caused to move behind the display plate. The display plate is provided with suitable floor symbols thereon so that the passage of light from the rear to the front of the display plate effects the display of the floor symbols. At the rear of the display plate there is mounted a cell-like structure so constructed that behind each floor symbol there is an individual cell extending radially from the rotatable cylinder. The arrangement is such that the light beam from the source of light is directed into the cell structure for one floor symbol at a time. After entering the cell structure, the light beam is reflected, as by an appropriate formation of the cell structure, through the corresponding floor symbol to effect the display thereof. The light beam is caused to rotate to effect the display of the floor symbols successively in accordance with the positions of the car by means of an impulse motor, which, in turn, is suitably actuated in accordance with the movements of the elevator car.

Figure 1:
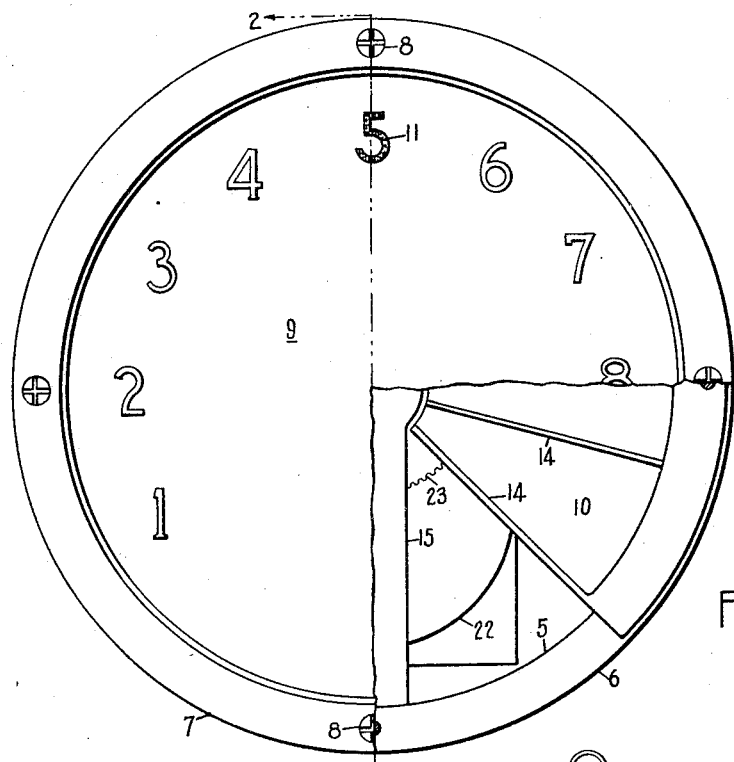
Figure 1 is a front elevation of a position indicator constructed in accordance with this invention, with portions broken away to show interior details thereof.
Figure 2:
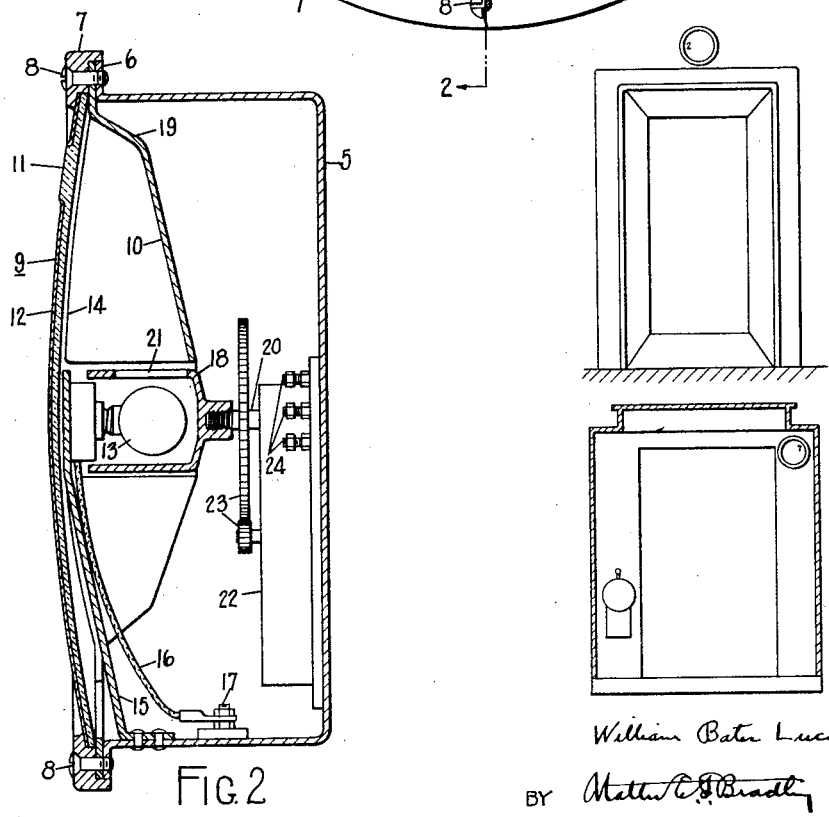
Figure 2 is a sectional view of the position indicator taken along the line 2—2 of Figure 1.

Referring to Figures 1 and 2 of the drawings, a cylindrical container 5 for the position indicator is provided with a flanged edge 6 at the front thereof. To this flanged edge 6, there is fastened a ring 7, as by the screws 8, for effecting a mounting for a display plate 9 and a reflector plate 10. The display 9 is, in the illustrated embodiment, a circular piece of glass upon which are formed the floor symbols 11. These floor symbols may be formed upon the display plate by sand blasting or etching away the entire surface of the glass except the portion thereof forming the floor symbols, and by then coating the roughened glass surface which has been sand blasted or etched with an opaque film 12. This film may be applied by coating the area with a lacquer in which is mixed powdered metal of the desired color. The entire surface of the display plate, except for the floor symbols, is therefore coated with an opaque film.

The reflector plate 10 extends around the major part of the circumference of the flange 6 so as to be in the rear of all the floor symbols with which the indicator is provided. The reflector plate is dished as at 19 in order to provide a reflecting surface appropriately formed so that the light from the source 13 may be reflected out to the floor symbols 11. It is preferred, for this purpose, to employ a highly polished and rustproof metal for the reflector plate 10. Radial fins 14 are mounted, as by spot welding, upon the reflector plate to provide an individual cell-like structure behind each floor symbol and thus to prevent the light that enters the cell-like structure for one floor symbol to cause the display of any adjacent floor symbol.

The source of light 13 is mounted at the center of the cylindrical container 5 upon a stationary bracket 15 adjacent the display plate 9. Leads 16, terminating at suitable binding posts 17, are provided for connecting to the source of light—in this instance an electric lamp. Surrounding the light source 13 is a cylinder 18 which is appropriately mounted upon a rotatable shaft 20. The cylinder 18 is provided with a slot 21 to direct a light beam from the light source to the cell structure behind each floor symbol individually and successively as the cylinder 18 is rotated. The rotation of the cylinder 18 is effected in the illustrated embodiment by means of an impulse motor shown in outline at 22. The armature of the impulse motor is connected to the shaft 20 by suitable reduction gearing 23. The impulse motor is provided with terminals 24 for connection to an appropriate control system for the impulse motor, the operation of the control system being dependent upon the position of the elevator car. Accordingly, the cylinder 18 is rotated in accordance with the position of the elevator car, and as a result, the display of the floor symbols 11, is effected in accordance with the position of the elevator car.

Figure 3:
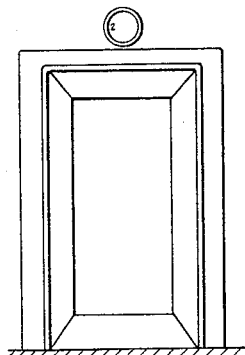
Figure 3 is a schematic view showing a placement of the position indicator over a hatchway door entrance.

In Figure 3 there is schematically illustrated a position indicator constructed in accordance with this invention mounted over a hatchway door entrance in an elevator system.

Figure 4:
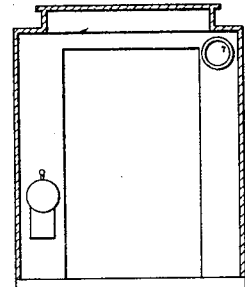
Figure 4 is a schematic view of the interior of a car showing the placement of the position indicator within the car.

In Figure 4 there is schematically indicated a position indicator constructed in accordance with this invention mounted in an elevator car.

Although an impulse motor is the means illustrated for effecting the rotation of the cylinder 18, other means may be utilized if so desired. Thus, for example, the cylinder 18 may be rotated by means of a wire or tape mechanically driven by the hoisting sheave of the elevator car.

Attention is directed to the fact that, if so desired, a shiftable screen with different colored portions thereon may be suitably mounted upon the cylinder 18, and provided with appropriate actuating mechanism so that the position indicator indicates not only the position of the car but also its direction of travel. In such instance it may be provided that when the car is travelling in an up direction the position indications may be displayed as green as a result of the light beam being transmitted through a green portion of the screen, and that when the car is travelling in a down direction the position may be displayed as red as a result of the light beam being transmitted through a red portion of the screen.

It is to be noted that although the preferred construction of this indicator employs a highly polished reflector plate 10, it is within the scope of this invention to employ other types of metals and other shapes thereof and to provide mirrors appropriately mounted near the radial limits of each cell structure for reflecting the light from the light source through the floor symbols 11.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A position indicator for an elevator comprising; a stationarily mounted light bulb; an opaque cylinder surrounding said light bulb and having a slot so that the light from said source which is transmitted through said cylinder is in the form of a light beam; means for rotatably supporting said cylinder in its position surrounding said light bulb so that, upon rotation of said cylinder, said radial light beam is rotated; a plurality of radial cell-structures, one for each floor to be indicated by said position indicator, stationarily mounted around the rotatable cylinder; a display plate mounted over said light bulb and said cell structures, said display plate having thereon a floor symbol for each floor to be indicated positioned over the cell structure for the corresponding floor, said floor symbols being adapted to be displayed by the passage of light through said display plate; means in each cell structure adapted to reflect the light beam when it enters said cell structure out through the display plate for effecting the display of the floor symbol corresponding thereto; and means for rotating said cylinder in accordance with the position of the elevator car for effecting the display of said floor symbols in accordance therewith.

2. A position indicator for an elevator car comprising; a stationarily mounted light bulb; an opaque cylinder surrounding said light bulb and having a slot in its cylindrical surface parallel to the axis of said cylinder so that the light from said source which is transmitted through said cylinder is in the form of a radial light beam; means for rotatably supporting said cylinder in its position surrounding said light bulb so that, upon rotation of said cylinder, said radial light beam is rotated; a circular, opaque display plate stationarily mounted at right angles to the axis of said rotatable cylinder, the diameter of said display plate being larger than the diameter of said rotatable cylinder so that there results an overlap portion of said display plate, said display plate being provided with a plurality of translucent floor symbols, one for each floor to be indicated by said position indicator, arranged circularly around the overlap portion thereof; a dished reflector plate stationarily mounted behind said display plate to reflect the light beam through the floor symbols upon the display plate; means for restricting the reflection of the light beam from the reflector plate to each floor symbol, individually; and an impulse motor for rotating said cylinder in accordance with the position of the elevator car for effecting the display of said floor symbols in accordance therewith.

In testimony whereof, I have signed my name to this specification.

WILLIAM BATES LUCAS.